United States Patent
Kim et al.

(10) Patent No.: US 9,491,449 B2
(45) Date of Patent: Nov. 8, 2016

(54) STEREOSCOPIC IMAGE DISPLAY DEVICE AND DRIVING METHOD THEREOF

(71) Applicants: SAMSUNG DISPLAY CO., LTD., Yongin, Gyeonggi-Do (KR); RESEARCH & BUSINESS FOUNDATION SUNGKYUNKWAN UNIVERSITY, Suwon-si, Gyeonggi-do (KR)

(72) Inventors: Hoon Kim, Ansan-si (KR); Jang-Kun Song, Seoul (KR); Hee Seop Kim, Hwaseong-si (KR); Ki Chul Shin, Seongnam-si (KR)

(73) Assignees: SAMSUNG DISPLAY CO., LTD., Yongin, Gyeonggi-Do (KR); RESEARCH & BUSINESS FOUNDATION SUNGKYUNKWAN UNIVERSITY, Suwon-Si, Gyeonggi-Do (KR)

( * ) Notice: Subject to any disclaimer, the term of this patent is extended or adjusted under 35 U.S.C. 154(b) by 21 days.

(21) Appl. No.: 14/332,885

(22) Filed: Jul. 16, 2014

(65) Prior Publication Data

US 2015/0145896 A1 May 28, 2015

(30) Foreign Application Priority Data

Nov. 26, 2013 (KR) .......................... 10-2013-0144859

(51) Int. Cl.
*H04N 13/04* (2006.01)
*G09G 3/00* (2006.01)
*G09G 3/36* (2006.01)

(52) U.S. Cl.
CPC .......... *H04N 13/0497* (2013.01); *G09G 3/003* (2013.01); *G09G 3/3648* (2013.01); *H04N 13/0438* (2013.01); *G09G 2320/0233* (2013.01); *G09G 2320/041* (2013.01); *G09G 2340/0435* (2013.01)

(58) Field of Classification Search
CPC ..................... H04N 13/0497; H04N 13/0429; H04N 13/0422; G09G 3/36; G09G 2320/0233; G09G 2320/041
See application file for complete search history.

(56) References Cited

U.S. PATENT DOCUMENTS

| 7,221,347 B2 | 5/2007 | Lee et al. |
| 8,111,270 B2 | 2/2012 | Kim et al. |
| 2009/0128586 A1* | 5/2009 | Ahn ..................... G09G 3/3648 345/690 |

(Continued)

FOREIGN PATENT DOCUMENTS

| JP | 2001-154170 | 6/2001 |
| KR | 1020110111638 | 10/2011 |

*Primary Examiner* — Shaheda Abdin
(74) *Attorney, Agent, or Firm* — F. Chau & Associates, LLC (57) ABSTRACT

A stereoscopic image display device includes an image compensator, a signal controller, a data driver, and a display panel. The image compensator is configured to convert input image data to revised image data. The revised image data is obtained by compensating for temperature variations of the display panel. The signal controller is configured to output the revised image data. The data driver is configured to receive the revised image data. The display panel includes a plurality of pixels configured to display a left eye image and a right eye image in response to receiving a data voltage from the data driver. The image compensator includes a temperature compensation lookup table selector having a temperature compensation lookup table, and a standard lookup table selector having a standard lookup table and configured to select the revised image data according to correction values selected from the temperature compensation lookup table.

18 Claims, 5 Drawing Sheets

(56) References Cited

U.S. PATENT DOCUMENTS

| | | |
|---|---|---|
| 2011/0096105 A1 | 4/2011 | Park et al. |
| 2011/0175978 A1* | 7/2011 | Ito .................. H04N 13/0497 348/43 |
| 2012/0120125 A1 | 5/2012 | Choi et al. |
| 2012/0127287 A1 | 5/2012 | Redmann |
| 2012/0257018 A1* | 10/2012 | Shigemura ......... G02B 27/2214 348/46 |
| 2013/0106827 A1 | 5/2013 | Zhao et al. |

* cited by examiner

| TEMPERATURE / Gray | ... | 20 | 25(STANDARD) | 30 | ... |
|---|---|---|---|---|---|
| 0 | ...... | 0 | 0 | 0 | ...... |
| 1 | ...... | 1 | 1 | 1 | ...... |
| 2 | ...... | 2.25 | 2. | 1.75 | ...... |
| 3 | ...... | 3.25 | 3 | 2.75 | ...... |
| . | ...... | .... | .... | .... | ...... |
| . | ...... | .... | .... | .... | ...... |
| . | ...... | .... | .... | .... | ...... |
| 253 | ...... | 254 | 253 | 250 | ...... |
| 254 | ...... | 255 | 254 | 252 | ...... |
| 255 | ...... | 255 | 255 | 253 | ...... |

FIG. 5

| EXISTING FRAME CORRECTION VALUE \ CURRENT FRAME CORRECTION VALUE | 0 | 10 | 50 | 100 | 200 | 255 |
|---|---|---|---|---|---|---|
| 0 |  |  |  |  |  | 255 |
| 10 | 0 |  |  |  |  | 255 |
| 50 | 0 |  |  |  |  | 255 |
| 100 | 0 |  |  |  |  | 255 |
| 200 | 0 |  |  |  |  | 255 |
| 255 | 0 |  |  |  |  |  |

STEREOSCOPIC IMAGE DISPLAY DEVICE AND DRIVING METHOD THEREOF

CROSS-REFERENCE TO RELATED APPLICATIONS

This application claims priority under 35 U.S.C. §119 to Korean Patent Application No. 10-2013-0144859 filed on Nov. 26, 2013, the disclosure of which is incorporated by reference herein in its entirety.

TECHNICAL FIELD

Exemplary embodiments of the present invention relate to a stereoscopic image display device and a driving method thereof.

DISCUSSION OF THE RELATED ART

A binocular parallax method is one of various methods for implementing a stereoscopic image display device (e.g., a three-dimensional (3D) display device).

The binocular parallax method uses disparity images of left and right eyes having a high stereoscopic effect.

The binocular parallax method includes a stereoscopic method that utilizes glasses worn by the viewer, and an autostereoscopic method that does not utilize glasses.

The stereoscopic method may display a stereoscopic image on a liquid crystal display (LCD) panel by changing a polarization direction of the disparity images of the left and right eyes. The stereoscopic image may be viewed using polarization glasses or liquid crystal shutter glasses.

The autostereoscopic method may utilize an optical plate such as a parallax barrier that separates optical axes of the disparity images of the left and right eyes at a front or rear of the LCD panel.

The temperature of the LCD panel may be determined, for example, by the temperature of the light source of a backlight unit and circuits of the LCD panel.

The temperature of the LCD panel may be continuously varied for a predetermined amount of time after being driven. The response time of the liquid crystal molecules in the LCD panel may vary while the temperature of the LCD panel is being changed. As a result, the display performance of the LCD panel may vary while the temperature of the LCD panel is being varied.

SUMMARY

Exemplary embodiments of the present invention provide a stereoscopic image display device and a driving method thereof that may provide uniform performance regarding response time variations of liquid crystal molecules according to temperature variations of a liquid crystal panel.

According to an exemplary embodiment of the present invention, a stereoscopic image display device includes an image compensator that converts input image data to revised image data which is compensated according to temperature variations of a current temperature condition, a signal controller that outputs the revised image data, a data driver that receives the revised image data which is corrected by the signal controller, a display panel including a plurality of pixels that display a left eye image and a right eye image in response to receiving a data voltage output from the data driver, and glasses including a left eye lens and a right eye lens which are controlled by a synchronization signal generated from the signal controller. The image compensator includes a temperature compensation lookup table selector including a temperature compensation lookup table, and a standard lookup table selector that selects the revised image data according to correction values selected from the temperature compensation lookup table.

A left eye image, a black image, a right eye image, and a black image may be alternately applied in this order when a stereoscopic image is applied at quadruple a basic frequency.

A left eye image and a right eye image may be alternately applied when a stereoscopic image is applied at double a basic frequency.

A left eye image, a left eye image, a right eye image, and a right eye image may be alternately applied in this order when a stereoscopic image is applied at quadruple a basic frequency.

A temperature compensation lookup table may include temperature, a target luminance value, and data regarding an input luminance value to obtain the target luminance value according to the temperature.

The image compensator may extract a low compensation value from the temperature compensation lookup table when the current temperature is higher than a standard temperature, and extract a high compensation value from the temperature compensation lookup table when the current temperature is lower than the standard temperature.

The image compensator may further include a temperature sensor that detects the current temperature from the panel, a temperature lookup table selector, and a temperature compensator that compensates the temperature using the revised image data extracted from the standard lookup table selector for converting the stereoscopic image.

The image compensator may further include a driving voltage applying unit that applies each pixel voltage corresponding to the luminance adjusted by the temperature compensator to the display panel.

The standard lookup table may include existing frame correction values, current frame correction values, and data regarding revised image data.

According to an exemplary embodiment of the present invention, a driving method for a stereoscopic image display device includes alternately inputting a left eye image and a right eye image to a display device as input image data, detecting a current temperature condition of a display panel forming the display device, and compensating the input image data according to temperature variations of the display panel using correction values corresponding to the current temperature condition. Compensating the input image data may include extracting correction values corresponding to a current temperature from a temperature compensation lookup table depending on a current temperature of the panel, and generating revised image data from a standard lookup table using the correction values.

Input image data of a right eye image of a previous frame preceding input image data of a left eye image may be used when compensating the input image data of the left eye image, and input image data of a left eye image of a previous frame preceding input image data of a right eye image may be used when compensating the input image data of the right eye image.

A data driver may be supplied with the generated revised image data.

An exemplary embodiment of the present invention includes a recording media which is readable by a computer and having a program embodying instructions to execute the driving method for the stereoscopic image display device.

According to an exemplary embodiment of the present invention, a stereoscopic image display device includes an image compensator configured to convert input image data to revised image data, wherein the revised image data is obtained by compensating for temperature variations of a display panel of the stereoscopic image display device, a signal controller configured to output the revised image data, a data driver configured to receive the revised image data, and the display panel. The display panel includes a plurality of pixels configured to display a left eye image and a right eye image in response to receiving a data voltage from the data driver. The image compensator includes a temperature compensation lookup table selector having a temperature compensation lookup table, and a standard lookup table selector having a standard lookup table and configured to select the revised image data according to correction values selected from the temperature compensation lookup table.

According to an exemplary embodiment of the present invention, a driving method of a stereoscopic image display device includes alternately inputting a left eye image and a right eye image to the stereoscopic image display device as input image data, detecting a current temperature of a display panel of the stereoscopic image display device, and compensating the input image data according to temperature variations of the display panel using correction values corresponding to the current temperature. Compensating the input image data includes selecting the correction values from a temperature compensation lookup table based on the current temperature of the display panel, and selecting revised image data from a standard lookup table using the correction values.

According to an exemplary embodiment of the present invention, a stereoscopic image display device includes a display panel including a plurality of pixels configured to display a left eye image and a right eye image, a temperature sensor configured to detect a current temperature of the display panel, and an image compensator configured to compensate input image data according to temperature variations of the display panel by selecting correction values corresponding to the current temperature from a temperature compensation lookup table, and selecting revised image data from a standard lookup table using the selected correction values.

According to an exemplary embodiment of the present invention, using two steps of a temperature compensation lookup table, an echo phenomenon may be improved in light of variations in response speed of liquid crystal molecules, and uniform performance of the stereoscopic image display device may be achieved by compensating the temperature. In addition, temperature dependent correction values may be adopted by disposing the temperature compensation lookup table selector before the standard lookup table selector such that the single standard lookup table can be applied to different types of liquid crystal display panels using respective different temperature compensation lookup tables.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Exemplary embodiments of the present invention will be described more fully hereinafter with reference to the accompanying drawings. Like reference numerals may refer to like elements throughout the accompanying drawings.

It will be understood that when an element such as a layer, film, region, or substrate is referred to as being "on" or "connected to" another element, it can be directly on or connected to the other element or intervening elements may also be present.

A stereoscopic image display device and a driving method thereof according to exemplary embodiments of the present invention will be described in detail with reference to the accompanying drawings.

A temperature compensation method for a liquid crystal display panel according to an exemplary embodiment of the present invention will be described in detail with reference to FIG. 1.

Figure 1:
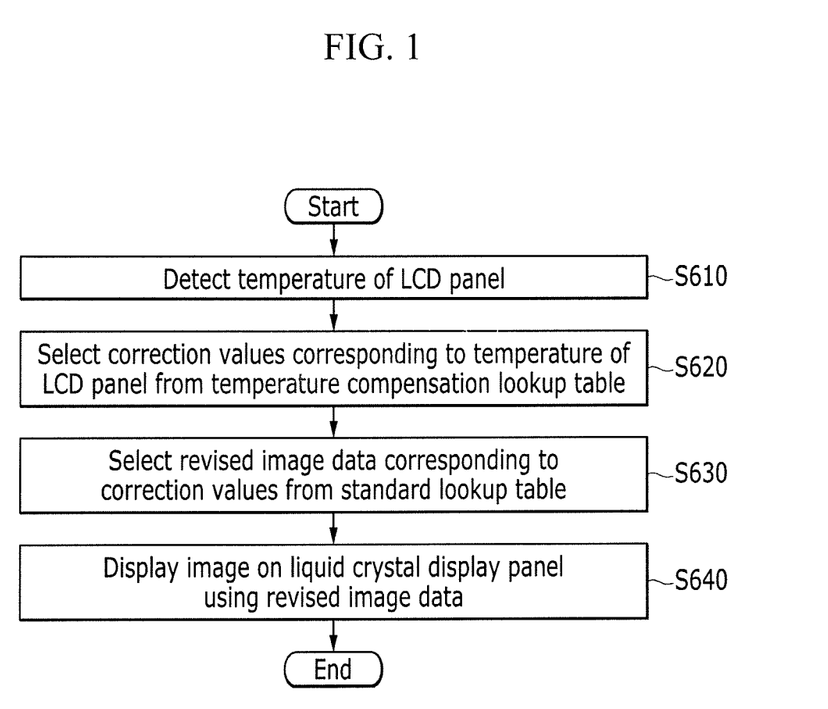
FIG. 1 is a flowchart of a temperature compensation method for a liquid crystal display panel according to an exemplary embodiment of the present invention.

FIG. 1 is a flowchart of a temperature compensation method for a liquid crystal display panel according to an exemplary embodiment of the present invention.

Referring to FIG. 1, at block S610, the temperature of the liquid crystal display panel is detected. At block S620, correction values (e.g., Lo' and Ro' in FIG. 3) corresponding to the temperature of the liquid crystal display panel are selected from a temperature compensation lookup table. At block S630, revised image data (e.g., Lm and Rm in FIG. 3) corresponding to the correction values are selected from the standard lookup table. At block S640, an image is displayed on the liquid crystal display panel using the revised image data.

For example, as will be described in further detail below, an exemplary embodiment of a stereoscopic image display device includes an image compensator, a signal controller, a data driver, and a display panel. The image compensator converts input image data to revised image data. The revised image data is obtained by compensating for temperature variations of the display panel. The signal controller outputs the revised image data, and the data driver receives the revised image data. The display panel includes a plurality of pixels that display a left eye image and a right eye image in response to receiving a data voltage from the data driver. The image compensator includes a temperature compensation lookup table selector having a temperature compensation lookup table, and a standard lookup table selector having a standard lookup table and configured to select the revised image data according to correction values selected from the temperature compensation lookup table.

When the temperature of the liquid crystal display panel does not reach a saturation temperature, the liquid crystal molecules of the liquid crystal display panel may have a slow response speed.

Accordingly, in an exemplary embodiment, the temperature compensation method compensates the response speed of the liquid crystal molecules in consideration of an actual temperature of the liquid crystal display panel.

In selecting correction values (e.g., Lo' and Ro' in FIG. 3) corresponding to the temperature of the liquid crystal display panel in the temperature compensation lookup table (block S620), a current input luminance value is converted into a virtual input luminance value to achieve a target luminance according to a temperature of a predetermined region.

Generally, since the response speed increases as the temperature increases, the luminance further increases as the temperature increases.

Thus, an input luminance value lower than the actual luminance value may be input as the temperature increases, and the temperature compensation lookup table may include data that coincides with the temperature conditions.

In selecting the correction values (e.g., Lo' and Ro' in FIG. 3) corresponding to the temperature of the liquid crystal display panel from the temperature compensation lookup table (block S620), an initial input value is corrected using the temperature compensation lookup table.

In selecting the revised image data (e.g., Lm and Rm in FIG. 3) corresponding to the correction values from the standard lookup table (block S630), the revised image data (e.g., Lm and Rm in FIG. 3), which are converted values of the correction values (e.g., Lo' and Ro' in FIG. 3) corresponding to the temperature of the liquid crystal display at block S620, are selected from the standard lookup table.

The standard lookup table may include existing frame correction values, current frame correction values, and information about the revised image data.

As described above, the lookup tables may include the temperature compensation lookup table and the standard lookup table, and may be set according to the temperatures so as to display a stereoscopic image (e.g., a three-dimensional (3D) image).

In displaying the image on the liquid crystal display panel using the revised image data (e.g., Lm and Rm in FIG. 3) (block S640), the revised image data may be used to adjust the luminance values output to the liquid crystal display panel.

A voltage for the virtual luminance applied to the liquid crystal display which does not reach the saturation temperature may be higher than the voltage for the target luminance in order to increase the input luminance to the target luminance.

Alternatively, in order to lower the input luminance to the target luminance, a voltage less than the voltage for the target luminance may be applied to the liquid crystal display panel which does not reach the saturation temperature.

A stereoscopic image display device according to an exemplary embodiment of the present invention will be described in further detail with reference to FIG. 2.

Figure 2:
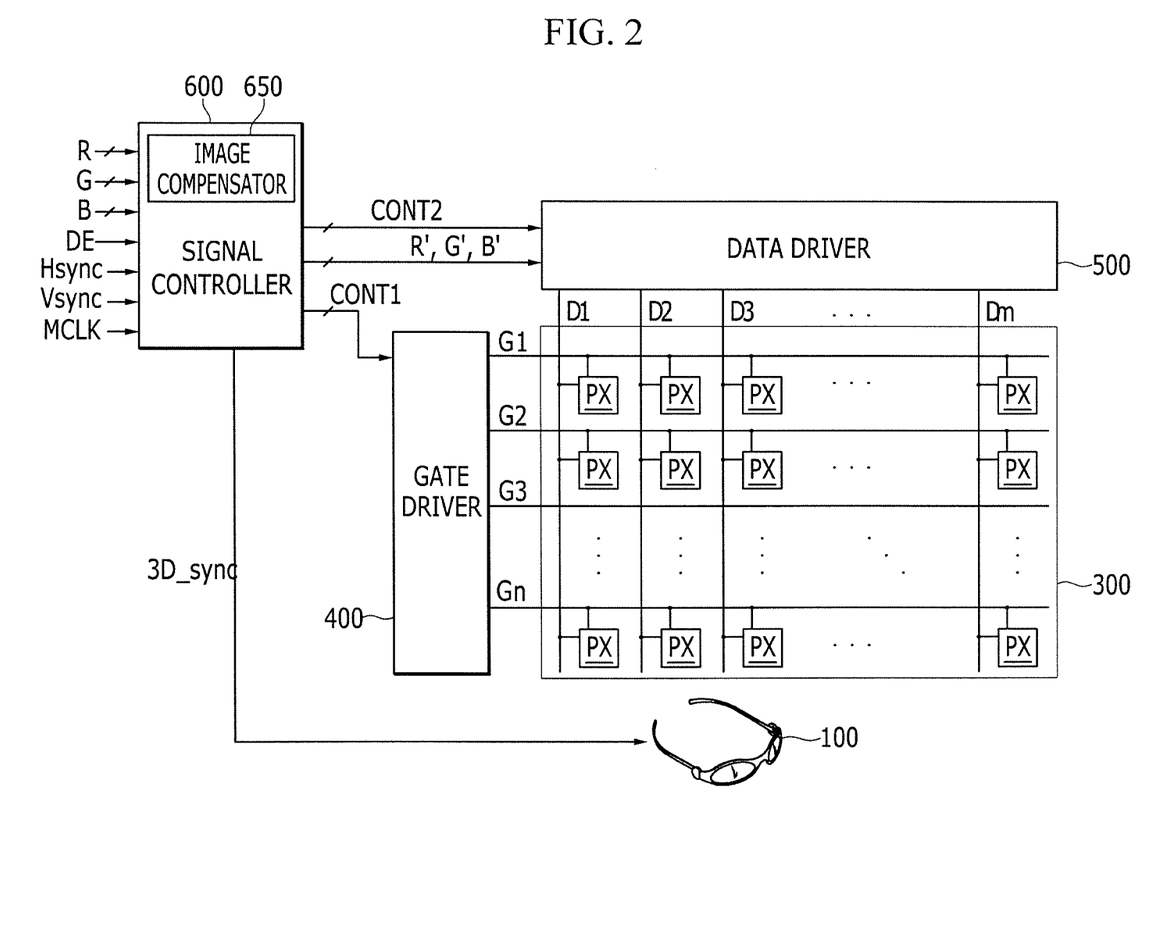
FIG. 2 is a block diagram of a stereoscopic image display device according to an exemplary embodiment of the present invention.

FIG. 2 is a block diagram of a stereoscopic image display device according to an exemplary embodiment of the present invention.

The stereoscopic image display device of FIG. 2 includes glasses 100 allowing a user to view a stereoscopic image, a liquid crystal display panel 300 that displays an image, a data driver 500 and a gate driver 400 that drive the liquid crystal display panel 300, and a signal controller 600 that controls the data driver 500 and the gate driver 400.

The liquid crystal display panel 300 includes a plurality of gate lines G1 to Gn and a plurality of data lines D1 to Dm. The plurality of gate lines G1 to Gn extend in a horizontal direction, and the plurality of data lines D1 to Dm extend in a vertical direction and cross the plurality of gate lines G1 to Gn.

Each of the gate lines G1 to Gn and the data lines D1 to Dm are connected to a pixel. Each pixel PX includes a switching element Q connected to the gate lines G1 to (in and the data lines D1 to Dm.

A control terminal of each switching element Q is connected to one of the gate lines G1 to Gn, an input terminal of each switching element Q is connected to one of the data lines D1 to Dm, and an output terminal of each switching element Q is connected to a pixel electrode.

Each pixel electrode forms one end of a liquid crystal capacitor.

According to exemplary embodiments, one pixel may include two or more sub-pixels, and each sub-pixel may have its own pixel electrode. However, exemplary embodiments are not limited thereto.

Further, each sub-pixel may have its own switching element Q, or the sub-pixels may have common switching elements Q.

The liquid crystal display panel 300 may display a stereoscopic image (e.g., a three-dimensional (3D) image) and a two-dimensional (2D) image.

The stereoscopic image is divided into a left eye image and a right eye image in each frame, and are respectively displayed.

Accordingly, the stereoscopic image is driven at a higher frequency than that of the 2D image.

In an exemplary embodiment, the 2D image is displayed at a basic frequency of 60 Hz, and the stereoscopic image is displayed at double or quadruple the basic frequency (e.g., 120 Hz or 240 Hz). That is, in exemplary embodiments, a 2D image may be displayed at a basic frequency, and the stereoscopic image may be displayed at double or quadruple the basic frequency at which the 2D image is displayed. However, exemplary embodiments are not limited thereto.

When the stereoscopic image is displayed at double the basic frequency, the left eye image and the right eye image may be alternately applied to the liquid crystal display panel 300. When the stereoscopic image is displayed at quadruple the basic frequency, the left eye image, the left eye image, the right eye image, and the right eye image may be alternately applied in this order to the liquid crystal display panel 300, or the left eye image, a black image ("black" in FIG. 3), the right eye image, and the black image ("black" in FIG. 3) may be alternately applied in this order to the liquid crystal display panel 300.

When viewing the stereoscopic image, insertion of the black image ("black" in FIG. 3) may eliminate or reduce crosstalk in which the right eye image and the left eye image are displayed to the wrong eyes.

A stereoscopic image frequency for displaying a 3D image and a 2D image frequency for displaying a 2D image may be controlled to be operated at a predetermined frequency in the signal controller 600.

The signal controller 600 receives image data R, G, and B and control signals of the image data R, G, and B. The control signals may include, for example, a vertical synchronization signal Vsync, a horizontal synchronization signal Hsync, a main clock signal MCLK, and a data enable signal DE. The signal controller processes the image data R, G, and B and the control signals in accordance with an operation condition of the liquid crystal display panel 300, and generates and outputs revised image data R', G', and B', a gate control signal CONT1, a data control signal CONT2, and a clock signal (e.g., glasses synchronization signal 3D_sync).

The revised image data R', G', and B' is temperature compensated image data based on received image data R, G, and B, and forms the revised image data Lm and Rm.

The signal controller 600 includes an image compensator 650 that generates the revised image data (e.g., Lm and Rm in FIG. 3) according to the temperature of the liquid crystal display panel 300.

Figure 3:
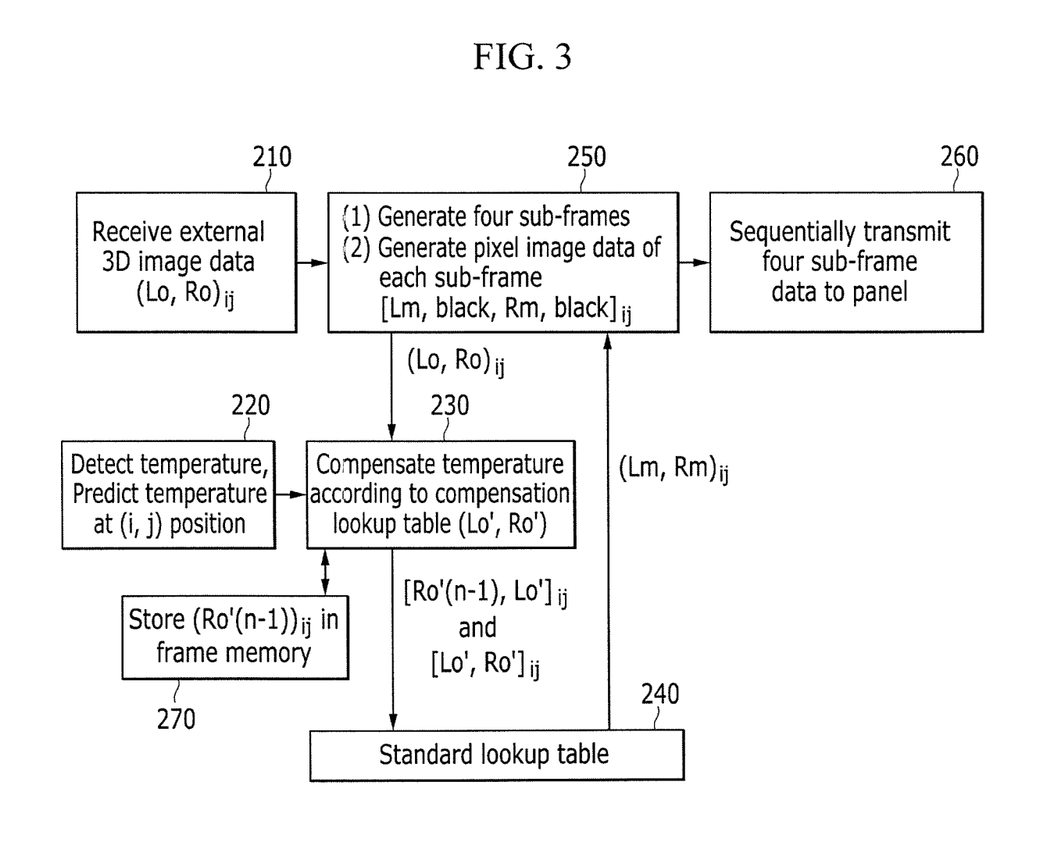
FIG. 3 is a block diagram of the image compensator of the signal controller shown in FIG. 2, according to an exemplary embodiment of the present invention.

In an exemplary embodiment, the image compensator 650 includes a plurality of lookup tables (LUT), and may change the input image data using an active lookup table.

In an exemplary embodiment, the image compensator 650 includes a lookup table for the stereoscopic image and a lookup table for the 2D image.

The lookup tables for the 2D and stereoscopic images may respectively include one or more lookup tables.

An exemplary embodiment of the present invention provides two types of lookup tables (e.g., a temperature compensation lookup table and a standard lookup table) to display the stereoscopic image.

The temperature compensation lookup table is used to determine the input luminance value according to the temperature in order to display the stereoscopic image of the liquid crystal display panel 300, and to select the input luminance value corresponding to the temperature of the liquid crystal display panel 300. The temperature of the liquid crystal display panel 300 may be detected by a liquid crystal display panel temperature sensor.

The standard lookup table is used to display the stereoscopic image using the correction values which are converted by a value selected from the temperature compensation lookup table according to the temperature, and to select the revised image data.

The gate control signal CONT1 may include a vertical synchronization start signal STV (hereinafter referred to as an STV signal) that controls an output start time of a gate-on pulse (e.g., a high period of a gate signal GS), and a gate clock signal CPV (hereinafter referred to as a CPV signal) that controls an output time of the gate-on pulse.

The data control signal CONT2 may include a horizontal synchronization start signal STH (hereinafter referred to as an STH signal) that controls an input start time of the image data R', G', and B', and a load signal TP (hereinafter referred to as a TP signal) that controls an application of corresponding data voltages to the data lines D1 to Dm.

The signal controller 600 outputs a glasses synchronization signal 3D_sync that turns a left lens and a right lens of the glasses 100 on and off in accordance with a display image of the liquid crystal display panel 300 to synchronize the glasses 100.

The plurality of gate lines G1 to Gn of the liquid crystal display panel 300 are connected to the gate driver 400, and the gate driver 400 alternately applies a gate-on voltage Von and a gate-off voltage Voff to the gate lines G1 to Gn according to the gate control signal CONT1 received from the signal controller 600.

The plurality of data lines D1 to Dm of the liquid crystal display panel 300 are connected to the data driver 500, and the data driver 500 receives the data control signal CONT2 and the revised image data R', G', and B' from the signal controller 600.

The data driver 500 converts the revised image data R', G', and B' to data voltages using analog gray voltages, and transmits the converted data voltages to the data lines D1 to Dm.

When the switching element Q of each pixel PX of the liquid crystal display panel 300 is turned on, the data voltage is charged in the corresponding liquid crystal capacitor.

The data voltages are alternately applied with positive and negative data voltages using an inversion driving method.

Hereinafter, the image compensator 650 will be described in further detail with references to FIGS. 3 to 5.

FIG. 3 is a block diagram of the image compensator 650 of the signal controller 600 shown in FIG. 2, according to an exemplary embodiment of the present invention.

Figure 4:
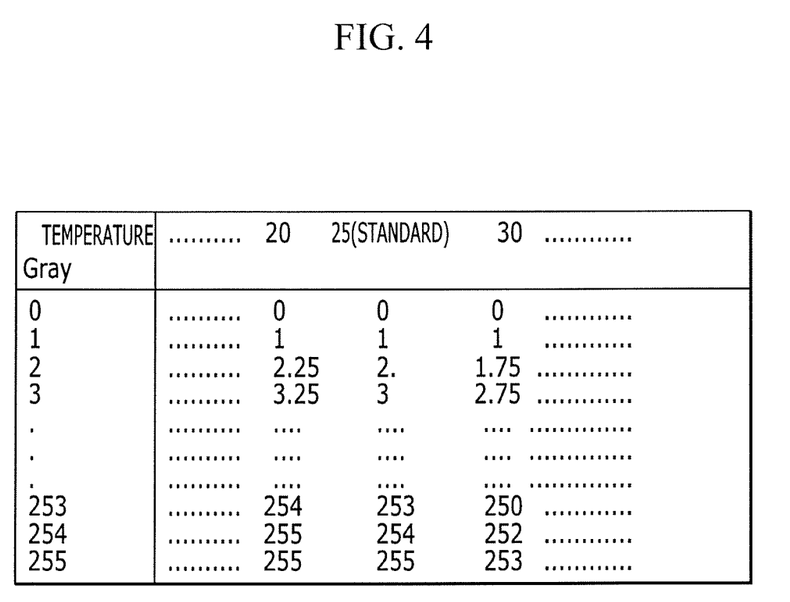
FIG. 4 is an example of a temperature compensation lookup table according to an exemplary embodiment of the present invention.

FIG. 4 is an example of a temperature compensation lookup table according to an exemplary embodiment of the present invention.

Figure 5:
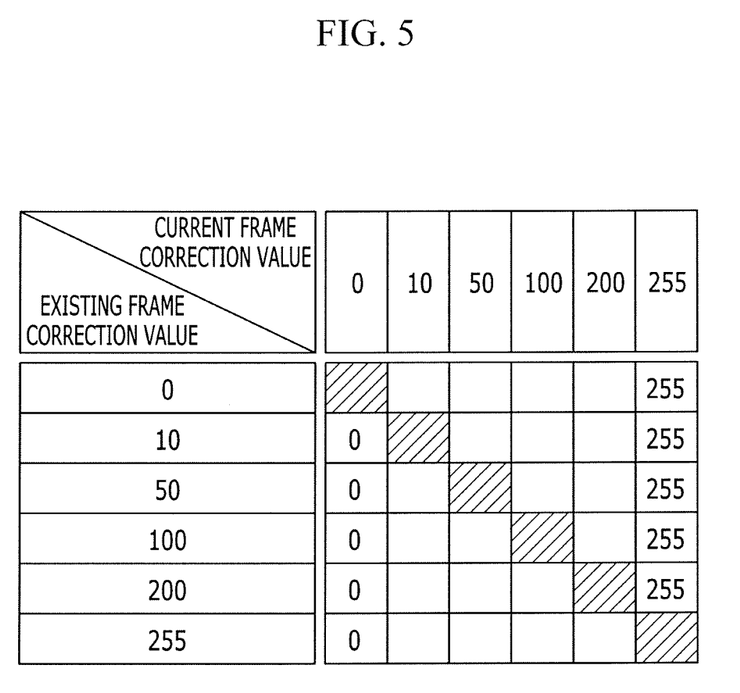
FIG. 5 is an example of a standard lookup table according to an exemplary embodiment of the present invention.

FIG. 5 is an example of a standard lookup table according to an exemplary embodiment of the present invention.

Referring to FIG. 3, in an exemplary embodiment, the image compensator 650 includes a liquid crystal display panel temperature sensor 220, a temperature compensation lookup table selector 230, a standard lookup table selector 240, a temperature compensator 250, a driving voltage applying unit 260, and a frame memory 270.

The liquid crystal display panel temperature sensor 220 detects the temperature of the liquid crystal display panel 300.

The liquid crystal display panel temperature sensor 220 may be a sensor that directly measures the temperature of the liquid crystal display panel 300, may directly measure the temperature using an additional sensor, or may detect the temperature using an operation time of the liquid crystal display panel 300 or a displayed image.

The overall temperature of the liquid crystal display panel 300 may be detected, or different correction values may be generated depending on different measured values obtained by measuring the temperature of the liquid crystal display panel 300 at different locations.

The temperature of the liquid crystal display panel 300 may be continuously varied for a predetermined time after being driven, and the response time of the liquid crystal display molecules may continuously change while the temperature of the liquid crystal display panel 300 is being varied.

For example, the response time of the liquid crystal display molecules may be slow at an initial driving stage of the liquid crystal display panel 300, and may become faster as the temperature of the liquid crystal display panel 300 increases to the saturation temperature.

Accordingly, exemplary embodiments of the present invention provide a method for compensating the response time of the liquid crystal molecules in consideration of the temperature detected by the liquid crystal display panel temperature sensor 220, as described herein.

The temperature compensation lookup table selector 230 includes a temperature compensation lookup table including the correction values Lo' and Ro' for compensating the stereoscopic image data Lo and Ro (210) according to the temperature.

The temperature compensation lookup table selector 230 selects the correction values Lo' and Ro' in accordance with the stereoscopic image data Lo and Ro input from the temperature compensation lookup table according to the temperature.

The temperature compensation lookup table selector 230 may select a low correction value from the temperature compensation lookup table when a current temperature is higher than a standard temperature (e.g., an expected temperature in view of current conditions), and may select a high correction value from the temperature compensation lookup table when the current temperature is lower than the standard temperature.

The temperature compensation lookup table selector 230 may include a storage area (e.g., a temperature compensation lookup table storage area) which stores the temperature compensation lookup table.

The standard lookup table selector 240 selects the lookup table to obtain the correction values Lo' and Ro' converted by the temperature compensation lookup table selector 230 according to the temperature in order to obtain the revised image data Lm and Rm for displaying the stereoscopic image.

The standard lookup table selector 240 may include a storage area (e.g., a lookup table storage area) which stores the lookup table for displaying the stereoscopic image of the liquid crystal display panel 300.

As illustrated in FIG. 5, the standard lookup table according to an exemplary embodiment may include existing frame correction values, current frame correction values, and information about the revised image data.

Referring to the standard lookup table for converting the stereoscopic image, Lm and Rm may be calculated from the correction values Lo' and Ro' previously converted and the previous frame data [Ro'(n−1)] using the following equations:

$$Lm=f[Lo',Ro'(n-1)]$$

$$Rm=f(Ro',Lo')$$

In this case, a correction factor may be added to account for interference between left and right images that may be increased due to off-time variations in the liquid crystal display panel 300.

The temperature compensator 250 may control the luminance values output to the liquid crystal display panel 300 using the lookup table which is selected by the standard lookup table selector 240.

When a current frame and a next frame are displayed in sequence on the liquid crystal display panel 300, the luminance of the current frame is the input luminance, and the luminance of the next frame is the target luminance.

Accordingly, in order to convert the input luminance of the current frame to the target luminance of the next frame based on the selected lookup table, the temperature compensator 250 may select the virtual luminance as the luminance to be output to the liquid crystal display panel 300.

The driving voltage applying unit 260 for the liquid crystal display panel 300 applies each pixel voltage, which corresponds to the luminance adjusted by the temperature compensator 250, to the liquid crystal display panel 300.

The adjusted luminance voltage may be over-driven by an over-driving method or under-driven by an under-driving method compared with the target luminance voltage.

Referring to 2D image frame data, an enhanced video algorithm may be used to apply an over-driving method in which a greyscale is increased or decreased depending on whether the image is changed by comparing the current frame data with the previous frame data stored in advance.

Referring to stereoscopic image frame data, since the left eye image and the right eye image are alternately displayed to construct the stereoscopic image, and since a static image may have different right and left eye images, a different framing method is utilized for stereoscopic image frame data.

For example, the frame data of a stereoscopic image may be sequenced starting with an (N−1)-th frame for the left eye image (referred to as L(n−1)), which is followed by an (N−1)-th frame for the right eye image (referred to as R(n−1)), an N-th frame for the left eye image (referred to as L(n)), an N-th frame for the right eye image (referred to as R(n)), an (N+1)-th frame for the left eye image (referred to as L(n+1)), and an (N+1)-th frame for the right eye image (referred to as R(n+1)).

Accordingly, previous frame data of the left eye image L(n) is R(n−1), and previous frame data of the right eye image R(n) is L(n).

Thus, the previous frame data R(n−1) is used to generate the stereoscopic image data of the left eye image L(n), and the left eye image L(n) of the current right eye image R(n) is used to generate the stereoscopic image data.

While referring to the same lookup table (referred to as f(a, b)) in converting the stereoscopic image, in order to find the N-th revised image data for the left eye (referred to as Lm(n)) and the N-th revised image data for the right eye (referred to Rm(n)), the input data may be differently applied according to the input values calculated from the following equations:

$$Lm(n)=f[Lo(n),Ro(n-1)]$$

$$Rm(n)=f[Ro(n),Lo(n)]$$

The above equations may be Lm(n)=f[Lo(n), Rm(n−1)] and Rm(n)=f[Ro(n), Lm(n)], where Lo(n) represents N-th stereoscopic image data for the left eye and Ro(n) represents N-th stereoscopic image data for the right eye.

Since the luminance can be varied according to the temperature of the liquid crystal display panel 300, these input values are accordingly converted such that the temperature of the liquid crystal display panel 300 is considered. Thus, the temperature compensation lookup table selector 230 converts the stereoscopic image data Lo and Ro to the correction values Lo' and Ro', which compensate the temperature variations of the liquid crystal display panel 300, as described above.

That is, the correction values Lo' and Ro' are generated in advance using temperature compensation as described herein before the stereoscopic image is constructed.

In this case, as shown in FIG. 4, the temperature compensation lookup table according to an exemplary embodiment may include the temperature, the target luminance value, and data indicating the input luminance value to be applied to obtain the target luminance value in accordance with the temperature. That is, the temperature compensation lookup table may include a listing of temperatures, a listing of target luminance values, and data indicating the input luminance values that, when applied, will result in obtaining a target luminance value according to the corresponding temperature.

The signal controller 600 may drive the liquid crystal display panel 300 in consideration of the temperature of the liquid crystal display panel 300 by applying each pixel voltage determined by referring to the temperature compensation lookup table for temperature compensation according to various temperatures of the liquid crystal display panel, and the standard lookup table for displaying the stereoscopic image.

The operating voltage of the liquid crystal display device may be over-driven or under-driven in consideration of the temperature of the liquid crystal display panel 300 to fully compensate the variations in the temperature-dependent response speed of the liquid crystal molecules.

Moreover, compared with the case of selecting the lookup table once, the number of the lookup tables may be further reduced by selecting the lookup tables two or more times to compensate the temperature of the liquid crystal display panel, thereby simplifying the driving process.

Exemplary embodiments of the present invention may be implemented in software as an application program tangibly embodied on a computer readable program storage device (e.g., a non-transitory tangible media). The application program can be executed by a computer to implement the driving method of the stereoscopic display device according to exemplary embodiments of the present invention. That is, a recording media that is readable by a computer may include a program to execute the driving method according to exemplary embodiments of the present invention as described herein.

According to exemplary embodiments of the present invention, an echo phenomenon in a stereoscopic display device may be improved by applying two steps of temperature compensation lookup table selections, even when the response speed of liquid crystal molecules in the LCD panel of the stereoscopic display device varies as a result of the temperature change of the LCD panel. By utilizing a temperature compensation lookup table selector before a standard lookup table selector and selecting the correction values according to the temperature, as described herein when referring to exemplary embodiments, performance of the stereoscopic display device may be improved (e.g., performance may be made more uniform) by applying the respective different temperature compensation lookup tables and the standard lookup table to various types of LCD panels.

According to exemplary embodiments, in a case in which a standard lookup table exists and correction values are not properly considered, temperature compensation may be made by adding the temperature lookup table for complementing the temperature without changing the overall standard lookup table, which may reduce efforts needed to revise the standard lookup table.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A stereoscopic image display device, comprising:
    an image compensator configured to convert input image data to revised image data, wherein the revised image data is obtained by compensating for temperature variations of a display panel of the stereoscopic image display device;
    a signal controller configured to output the revised image data;
    a data driver configured to receive the revised image data; and
    the display panel comprising a plurality of pixels configured to display a left eye image and a right eye image in response to receiving a data voltage from the data driver,
    wherein the image compensator comprises a temperature compensation lookup table selector having a temperature compensation lookup table, and a standard lookup table selector having a standard lookup table,
    wherein the temperature compensation lookup table comprises a plurality of correction values, and the temperature compensation lookup table selector is configured to select two correction values from among the plurality of correction values in the temperature compensation lookup table based on a current temperature,
    wherein the standard lookup table selector is configured to select the revised image data from the standard lookup table, wherein the revised image data comprises two values that are converted values of the two selected correction values,
    wherein the temperature compensation lookup table and the standard lookup table are different types of lookup tables that include different types of data,
    wherein the temperature compensation lookup table includes a temperature, a target luminance value, and data indicating an input luminance value corresponding to the target luminance value according to the temperature.

2. The display device of claim 1, wherein a left eye image, a black image, a right eye image, and the black image are alternately applied to the display panel in this order when a stereoscopic image is displayed on the display panel at quadruple a basic frequency.

3. The display device of claim 1, wherein a left eye image and a right eye image are alternately applied to the display panel when a stereoscopic image is displayed on the display panel at double a basic frequency.

4. The display device of claim 1, wherein a left eye image, the left eye image, a right eye image, and the right eye image are alternately applied to the display panel in this order when a stereoscopic image is displayed on the display panel at quadruple a basic frequency.

5. The display device of claim 1, wherein the temperature compensation lookup table selector is configured to select a low correction value from the temperature compensation lookup table when the current temperature is higher than a standard temperature, and select a high correction value from the temperature compensation lookup table when the current temperature is lower than the standard temperature.

6. The display device of claim 1, wherein the image compensator comprises:
    a temperature sensor configured to detect the current temperature of the display panel; and
    a temperature compensator configured to compensate for the temperature variations using the revised image data.

7. The display device of claim 6, wherein the image compensator comprises a driving voltage applying unit configured to apply a pixel voltage to each of the plurality of pixels corresponding to an adjusted luminance determined by the temperature compensator.

8. The display panel of claim 1, wherein the standard lookup table includes existing frame correction values, current frame correction values, and data regarding the revised image data.

9. The display panel of claim 1, further comprising:
    glasses comprising a left eye lens and a right lens controlled by a synchronization signal generated by the signal controller.

10. A driving method of a stereoscopic image display device, comprising:
    alternately inputting a left eye image and a right eye image to the stereoscopic image display device as input image data;
    detecting a current temperature of a display panel of the stereoscopic image display device; and
    compensating the input image data according to temperature variations of the display panel using correction values corresponding to the current temperature,
    wherein compensating the input image data comprises selecting the correction values from a temperature compensation lookup table based on the current temperature of the display panel, and selecting revised image data from a standard lookup table using the correction values, wherein the temperature compensation lookup table and the standard lookup table are different types of lookup tables that include different types of data, wherein the temperature compensation lookup table includes a temperature, a target luminance value, and data indicating an input luminance value corresponding to the target luminance value according to the temperature.

11. The method of claim 10, wherein input image data of a right eye image of a previous frame preceding input image data of a left eye image is used when compensating the input image data of the left eye image, and input image data of a left eye image of a previous frame preceding input image data of a right eye image is used when compensating the input image data of the right eye image.

12. The method of claim 10, further comprising:
providing the revised image data to a data driver of the stereoscopic image display device.

13. The method of claim 10, wherein compensating the input image data comprises:
selecting a low correction value when the current temperature is higher than a standard temperature; and
selecting a high correction value when the current temperature is lower than the standard temperature.

14. The method of claim 10, further comprising:
applying a pixel voltage to each of a plurality of pixels of the display panel, wherein the pixel voltage corresponds to the revised image data.

15. The method of claim 10, wherein the standard lookup table includes existing correction values, current correction values, and data regarding the revised image data.

16. A recording media readable by a computer and comprising a program embodying instructions to execute the driving method of claim 10.

17. A stereoscopic image display device, comprising:
a display panel comprising a plurality of pixels configured to display a left eye image and a right eye image;
a temperature sensor configured to detect a current temperature of the display panel; and
an image compensator configured to compensate input image data according to temperature variations of the display panel by selecting correction values corresponding to the current temperature from a temperature compensation lookup table, and selecting revised image data from a standard lookup table using the selected correction values, wherein the temperature compensation lookup table and the standard lookup table are different types of lookup tables that include different types of data, wherein the temperature compensation lookup table includes a temperature, a target luminance value, and data indicating an input luminance value corresponding to the target luminance value according to the temperature.

18. The stereoscopic image display device of claim 17, further comprising:
glasses comprising a left eye lens and a right lens controlled by a synchronization signal generated by a signal controller of the stereoscopic image display device.

* * * * *